(12) United States Patent
Goodman et al.

(10) Patent No.: US 11,801,740 B1
(45) Date of Patent: Oct. 31, 2023

(54) FLEXIBLE COVER SYSTEM

(71) Applicant: Karogen LLC, Delray Beach, FL (US)

(72) Inventors: Kathy E. Goodman, Delray Beach, FL (US); Robert Sunstone, North Palm Beach, FL (US)

(73) Assignee: KAROGEN LLC, Delray Beach, FL (US)

( * ) Notice: Subject to any disclaimer, the term of this patent is extended or adjusted under 35 U.S.C. 154(b) by 0 days.

(21) Appl. No.: 18/296,551

(22) Filed: Apr. 6, 2023

Related U.S. Application Data (60) Provisional application No. 63/373,366, filed on Aug. 24, 2022.

(51) Int. Cl.
*B60J 11/04* (2006.01)

(52) U.S. Cl.
CPC ..................................... *B60J 11/04* (2013.01)

(58) Field of Classification Search
CPC ........ B60J 11/04; B65D 85/02; A45C 13/002; A45C 13/08; A45C 13/083
See application file for complete search history.

(56) References Cited

U.S. PATENT DOCUMENTS

| | | | | |
|---|---|---|---|---|
| 2,302,560 A * | 11/1942 | Santo | ...................... | A45C 13/08 40/655 |
| 2,920,671 A * | 1/1960 | Herbert | ...................... | G09F 7/02 150/112 |
| 2003/0164217 A1* | 9/2003 | Huang | ................... | A45C 13/08 150/120 |
| 2012/0175030 A1* | 7/2012 | Pace | ........................ | A45C 3/08 150/105 |
| 2014/0150937 A1* | 6/2014 | Favalora, III | ............ | B60J 11/04 150/166 |
| 2014/0312647 A1* | 10/2014 | Wang | ...................... | B60J 11/04 296/136.02 |

* cited by examiner

*Primary Examiner* — Sue A Weaver
(74) *Attorney, Agent, or Firm* — Peter J. Van Bergen (57) ABSTRACT

A flexible cover system includes a sheet of flexible material having a first face and a second face. Each receptacle from a set of receptacles has walls coupled to the sheet's first face that extend to an opening of the receptacle. The walls associated with each receptacle are separated from the walls associated with adjacent ones of the receptacles by an air-filled gap. Each body from a set of bodies is configured for retention in one of the receptacles by the walls associated therewith.

17 Claims, 12 Drawing Sheets

FLEXIBLE COVER SYSTEM

Pursuant to 35 U.S.C. § 119, the benefit of priority from provisional application 63/373,366, with a filing date of Aug. 24, 2022, is claimed for this non-provisional application.

FIELD OF THE DISCLOSURE

This disclosure relates generally to covering systems, and more particularly to a flexible cover system configurable to be decorative and/or functional.

BACKGROUND

Damage to surfaces such as vehicle body surfaces is unsightly, is costly to repair, and reduces the value of a vehicle. Certain parts or regions of a vehicle are prone to being damaged during everyday use. For example, vehicles parked or moving in a parking lot are frequently subject to front/rear bumper damage and/or side-of-vehicle (e.g., the doors) dings. While these types of damages do not generally impact the operation or use of the vehicle, they negatively impact the vehicle's appearance and value.

SUMMARY

Accordingly, it is an object of the present disclosure to describe a system that can cover a surface region.

Another object of the present disclosure is to describe a system that can be used to cover and protect a surface region.

Still another object of the present disclosure is to describe a system that can be customized to decoratively cover and protect a selected surface region of a vehicle.

Other objects and advantages of the present disclosure will become more obvious hereinafter in the specification and drawings.

In accordance with the present disclosure, a system includes a sheet of flexible material having a first face and a second face opposing the first face. Each receptacle from a set of receptacles has walls coupled to the sheet's first face that extend to an opening of the receptacle. The walls associated with each receptacle are separated from the walls associated with adjacent ones of the receptacles by an air-filled gap. Each body from a set of bodies is configured for retention in one of the receptacles by the walls associated therewith.

BRIEF DESCRIPTION OF THE DRAWINGS

Other objects, features and advantages of the present disclosure will become apparent upon reference to the following description of embodiments thereof and to the drawings, wherein corresponding reference characters indicate corresponding parts throughout the several views of the drawings and wherein.

DETAILED DESCRIPTION

Figure 1:
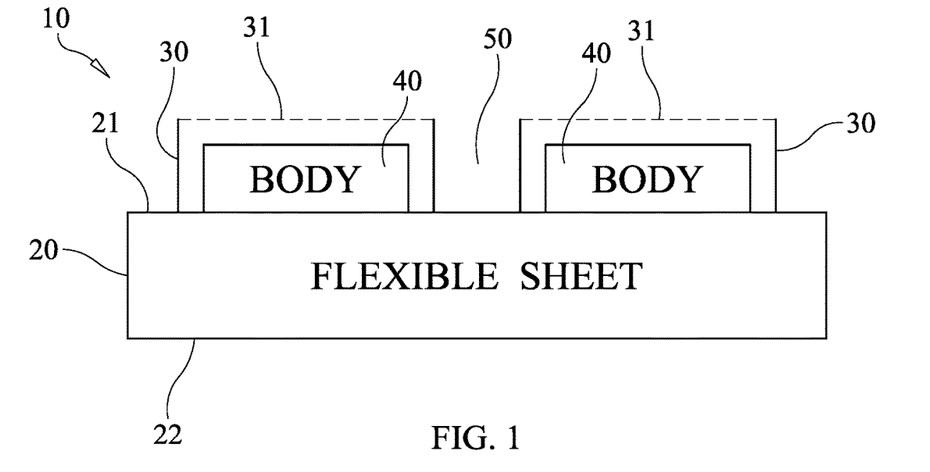
FIG. 1 is a schematic illustration of one embodiment of a flexible cover system in accordance with various aspects as described herein.

Referring now to the drawings and more particularly to FIG. 1, a schematic view of an embodiment of a flexible cover system is shown and is referenced generally by numeral 10. Flexible cover system 10 may be used to cover a variety of surfaces. For example, one or more regions of a vehicle body surface (not shown) may be covered by flexible cover system 10. In some embodiments, flexible cover system 10 may be used to cosmetically cover or hide some existing surface damage. In some embodiments, flexible cover system 10 may be used as a decoration on a surface that has some or no damage. In some embodiments, flexible cover system 10 may be used to protect a surface from damage. Accordingly, flexible cover system 10 may be a decorative and/or functional covering for a surface such as a vehicle body surface.

In the illustrated example, flexible cover system 10 includes a sheet 20 of flexible material, a set of receptacles or cells 30, and a set of bodies 40. Sheet 20 may be a flexible rubber or rubber-like material whose thickness is selected to allow sheet 20 to flex and readily conform to the contours of a surface region (not shown) that system 10 is to cover. Sheet 20 has opposing faces 21 and 22 where, in use, face 22 will be positioned adjacent to a surface region to be covered as will be explained further below.

Each of receptacles 30 is an open-top receptacle or cell that is coupled to face 21 of sheet 20. Each receptacle 30 is open at the top thereof as indicated by a dashed line 31. In some embodiments, opening 31 may be parallel to face 21 of sheet 20. In some embodiments, opening 31 may be non-parallel with respect to face 21 of sheet 20. In some embodiments, some of receptacles 30 may have openings in the side walls thereof. Positioned in each receptacle 30 via its opening 31 is a body 40. In some embodiments, each receptacle 30 may be configured to retain its body 40 therein. Each body 40 is visible via the corresponding opening 31 of the receptacle 30 retaining the body. Each body 40 may be purely decorative (e.g., presenting a color at opening 31, presenting a design at opening 31, etc.) or may be configured to additionally or alternatively provide functionality. For example, in the case of flexible cover system 10 being used on a vehicle, bodies 40 may present as reflectors at opening 31. The materials used for bodies 40 are not limitations of system 10. Each receptacle 30 is separated from any adjacent receptacle 30 by an air-filled gap 50. Gaps 50 allow system 10 to flex in accordance with the flexibility of sheet 20 while also facilitating the cutting of sheet 20 thereby allowing the size and shape of flexible cover system 10 to be customized for a particular application.

Figure 2:
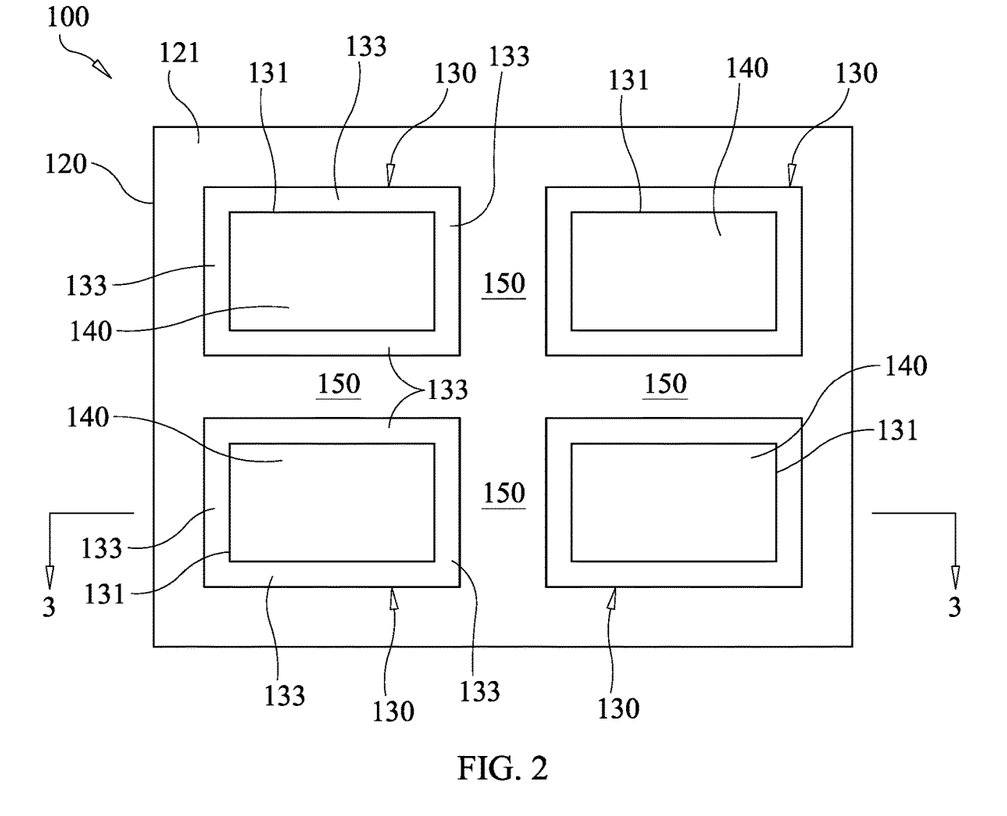
FIG. 2 is a plan view illustration of one embodiment of a flexible cover system in accordance with various aspects as described herein.

Referring now to the plan view shown in FIG. 2, an embodiment of a flexible cover system 100 is illustrated. Flexible cover system 100 includes a sheet 120 of flexible material, a set of receptacles 130 disposed on a face 121 of sheet 120, and a corresponding set of bodies 140 where each body 140 is positioned and retained in one of receptacles 130. The number, shape and size of receptacles 130 may be varied without departing from the scope of the present disclosure. In some embodiments, receptacles 130 may be arrayed in one or two dimensions. In the illustrated example, receptacles 130 are rectangular. In other embodiments, receptacles 130 may be round, square, triangular, etc., as well as a combination of shapes and sizes. Each receptacle 130 is separated from adjacent receptacles 130 by an air-filled gap 150.

Figure 3A:
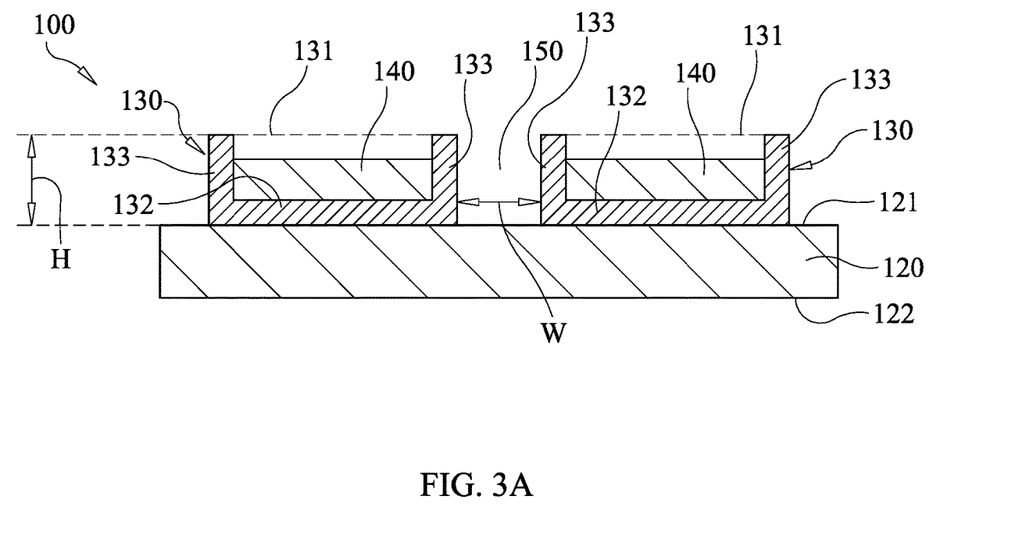
FIG. 3A is a cross-sectional view illustration of one embodiment of a flexible cover system taken along line 3-3 in FIG. 2 in accordance with various aspects as described herein.
Figure 3B:
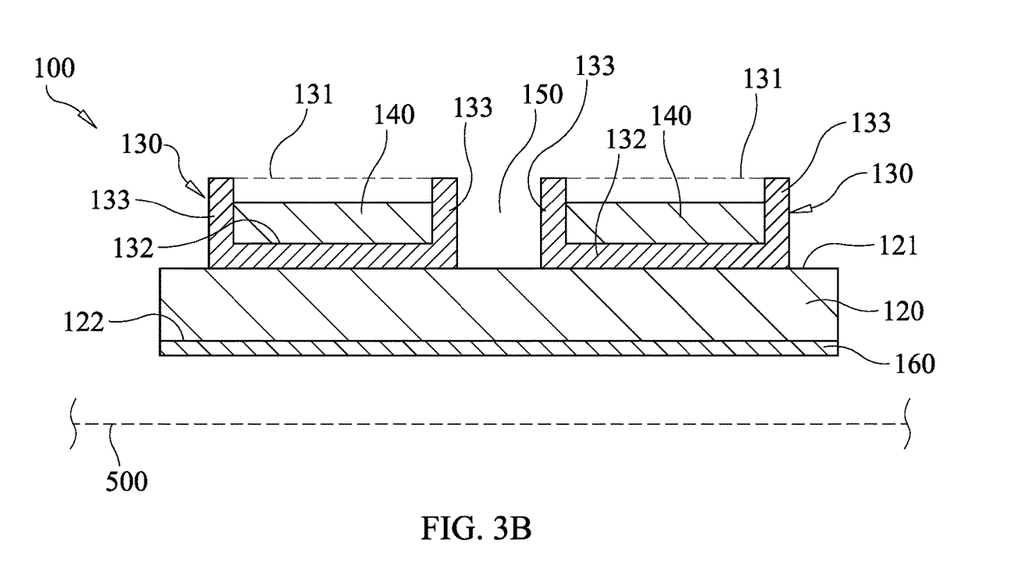
FIG. 3B is a cross-sectional view illustration of another embodiment of a flexible cover system taken along line 3-3 in FIG. 2 in accordance with various aspects as described herein.

Referring now to the cross-sectional views illustrated in FIGS. 3A-3D, several exemplary embodiments of flexible cover system 100 are shown. In FIG. 3A, each receptacle 130 includes a base 132 coupled to face 121 of sheet 120, and walls 133 extending away from base 132 up to the receptacle's opening 131. An air-filled gap 150 separates walls 133 associated with adjacent receptacles 130. The height "H" of walls 133 and the width "W" of gap 150 contribute to the flexibility of system 100. That is, flexibility of system 100 is greatest when height H and width W combine to prevent adjacent receptacles 130 from touching during flexing of system 100. A face 122 of sheet 120 opposes face 121. In some embodiments, walls 133 are flexible and elastic to facilitate the placement of a body 140 therein as well as facilitate its retention in the receptacle. In FIG. 3B, face 122 has a material 160 disposed thereon that supports the coupling of flexible cover system 100 to a surface 500. For example, material 160 may be an adhesive selected for adherence to surface 500. In some embodiments where surface 500 is magnetically attractive (e.g., a vehicle body surface), material 160 may be a magnetic sheet coupled to face 122.

Figure 3C:
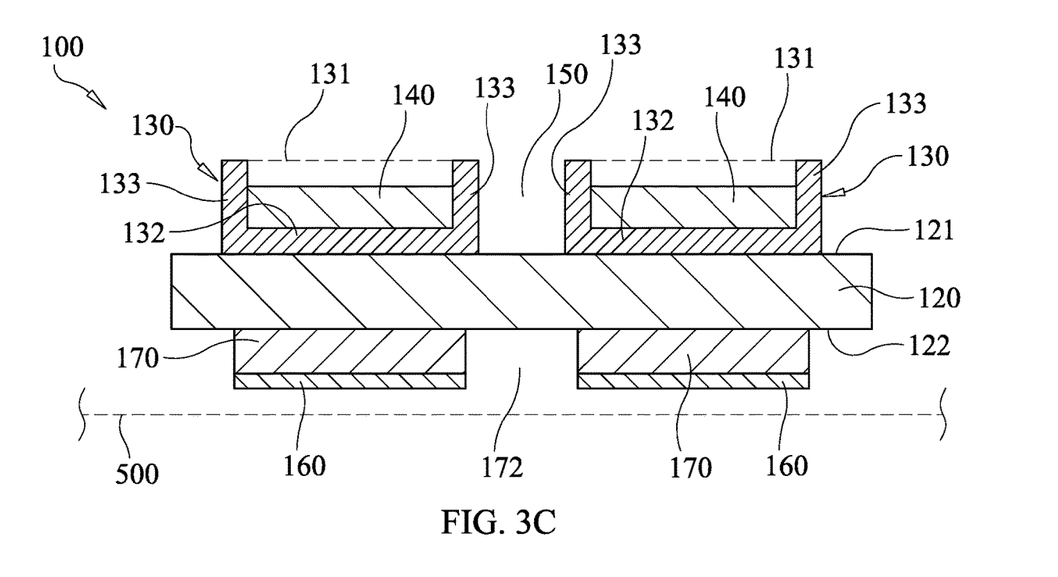
FIG. 3C is a cross-sectional view illustration of another embodiment of a flexible cover system taken along line 3-3 in FIG. 2 in accordance with various aspects as described herein.

In FIG. 3C, flexible cover system 100 may include a set of flexible cushions 170 coupled to face 122. Each cushion 170 is aligned with one of receptacles 130 on face 121 such that an air-filled gap 172 separates adjacent ones of cushions 170. Cushions 170 absorb impact forces received at the receptacle side of system 100. By positioning cushions 170 in alignment with receptacles 130 with air-filled gaps 172 there between, the flexibility of sheet 120 is not compromised by the presence of cushions 170. Cushions 170 may be a solid material (e.g., rubber, foam, etc.). Each of cushions 170 can have an adhesive or magnetic material 160 disposed thereon for facilitating attachment to surface 500 as explained above.

Figure 3D:
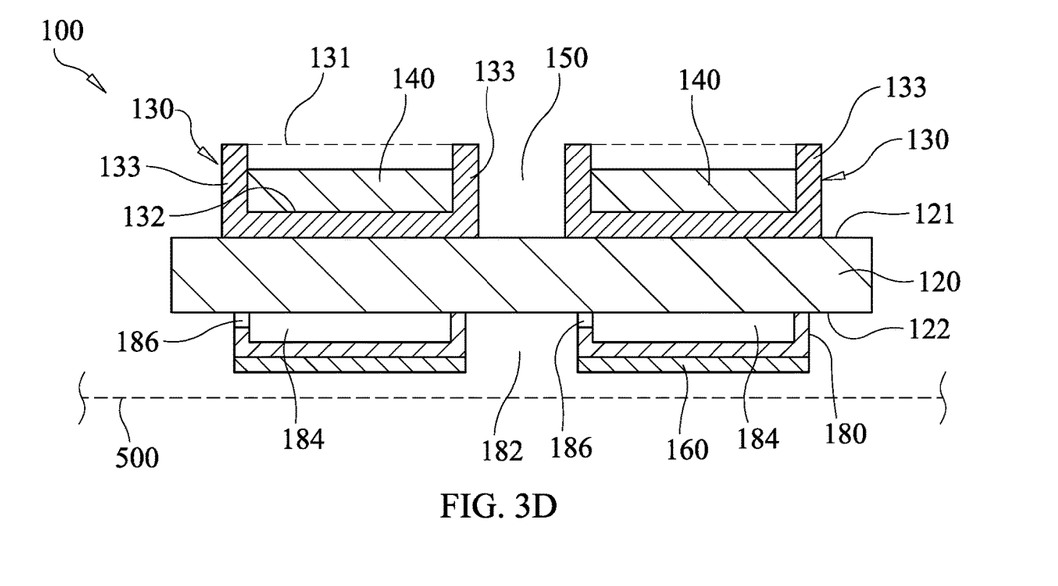
FIG. 3D is a cross-sectional view illustration of another embodiment of a flexible cover system taken along line 3-3 in FIG. 2 in accordance with various aspects as described herein.

In another embodiment illustrated in FIG. 3D, a set of flexible cushions 180 are coupled to face 122. Each cushion 180 is aligned with one of receptacles 130 on face 121 such that an air-filled gap 182 separates adjacent ones of cushions 180. Cushions 180 absorb impact forces received at the receptacle side of system 100. By positioning cushions 180 in alignment with receptacles 130 with air-filled gaps 182 there between, the flexibility of sheet 120 is not compromised by the presence of cushions 180. Cushions 180 may be made from a flexible material and include an air space 184 therein that is vented at 186. When system 100 is exposed to impact forces at the receptacle side thereof, vented cushions 180 collapse as the air in air space 184 vents at 186. When the impact force is removed, vented cushions 180 re-inflate at vents 186. Each of cushions 180 can have an adhesive or magnetic material 160 disposed thereon for facilitating attachment to surface 500 as explained above. In some embodiments, at least some of air gaps 182 may be filled with an object or device providing diverse utility (e.g., sensing, power, communications, etc.).

Figure 4A:
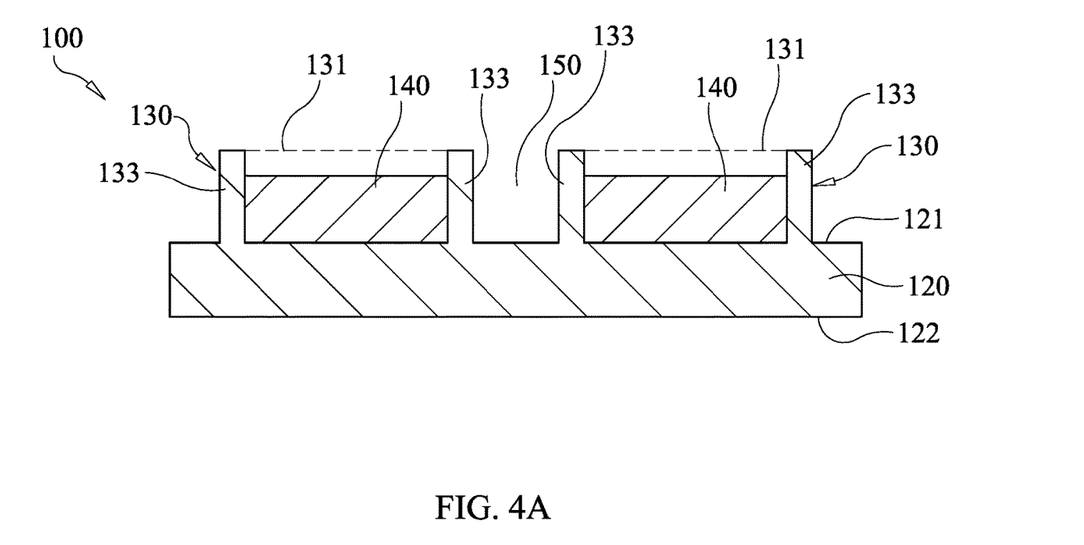
FIGS. 4A-4D are cross-sectional view illustrations of other embodiments of a flexible cover system taken along line 3-3 in FIG. 2 in accordance with various aspects as described herein.
Figure 4B:
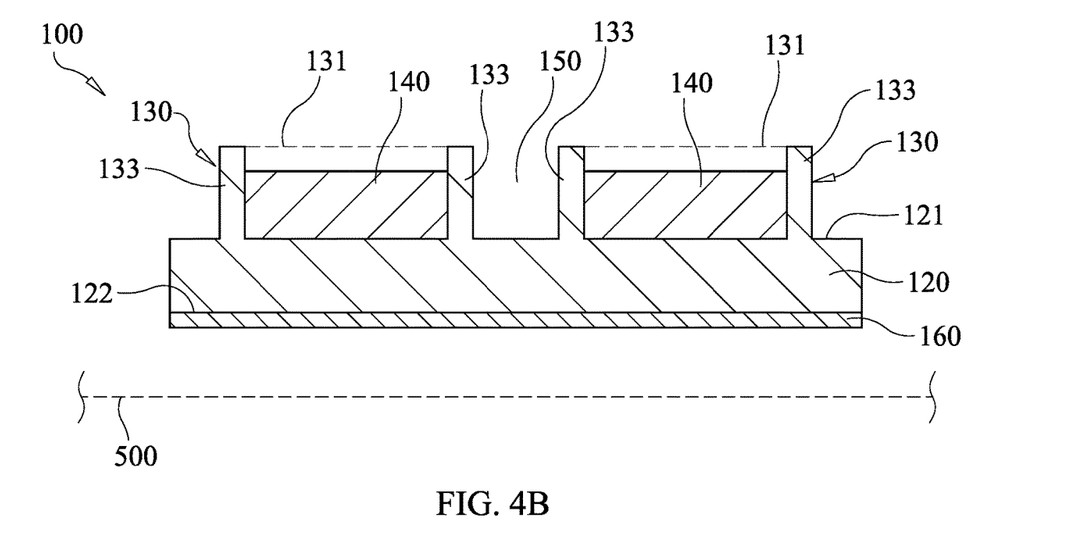
Figure 4C:
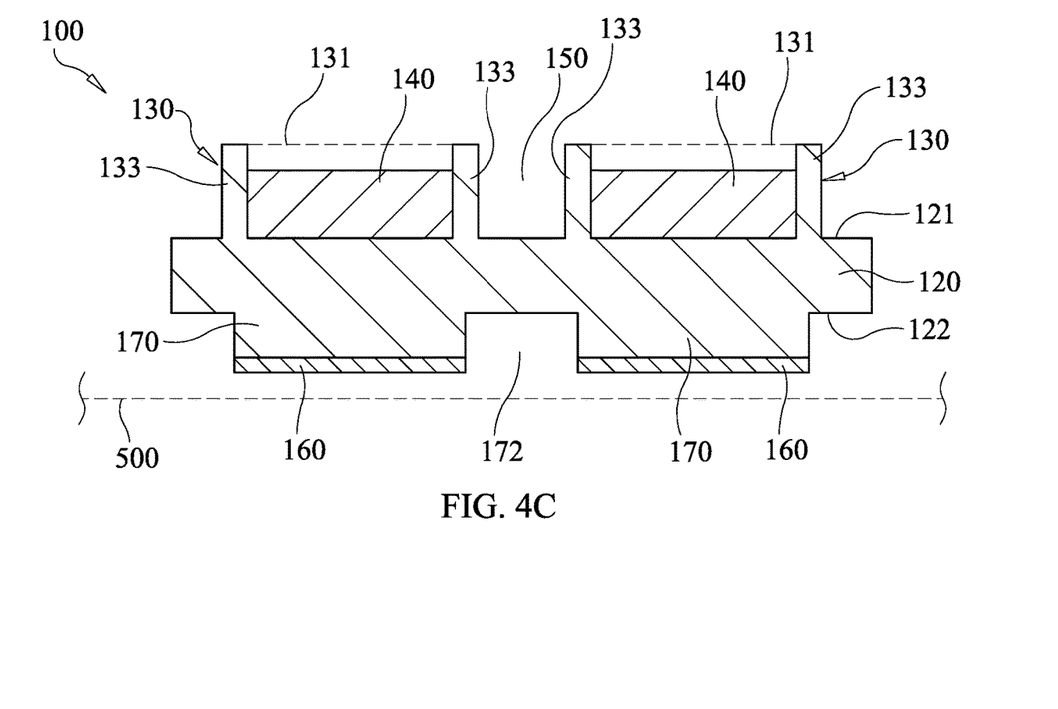
Figure 4D:
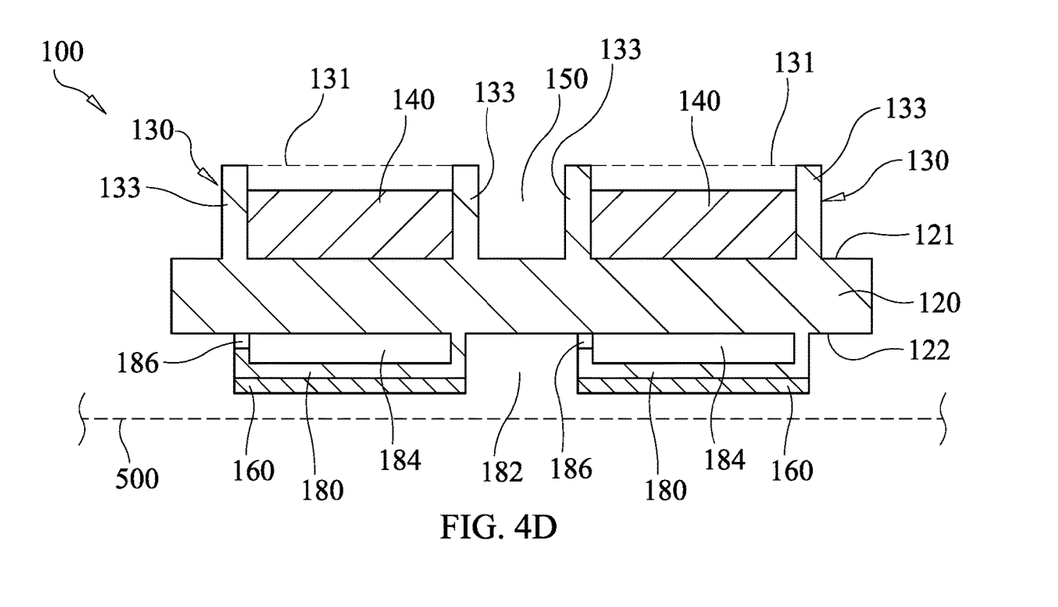

In some embodiments, the material used for the above-described sheet (e.g., sheet 20 or 120) may also be used to form integral receptacles (e.g., receptacles 30 or 130) and, if present, integral cushions such as cushions 170 or 180. Exemplary embodiments of system 100 employing such integrations for the embodiments illustrated in FIGS. 3A-3D are illustrated in the cross-sectional views presented in FIGS. 4A-4D. In FIGS. 4A-4B, each receptacle 130 is an open cell having walls 133 integrated with sheet 120 such that a portion of face 121 is essentially the base of each receptacle 130. In FIG. 4B, a material 160 (e.g., an adhesive, a magnetic sheet, etc.) may be provided on face 122 to facilitate attachment of system 100 to surface 500. In FIG. 4C, solid cushions 170 are also integrated with sheet 120. In FIG. 4D, vented cushions 180 are also integrated with sheet 120.

Figure 5:
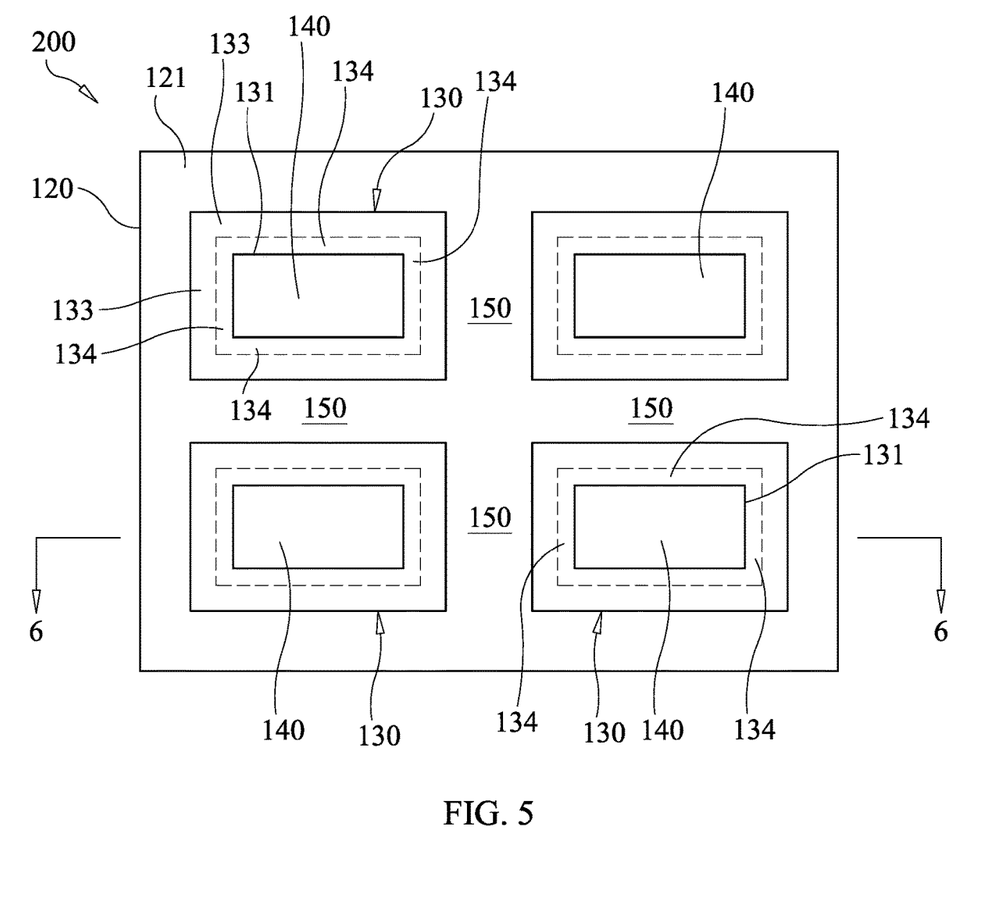
FIG. 5 is a plan view illustration of another embodiment of a flexible cover system in accordance with various aspects as described herein.
Figure 6A:
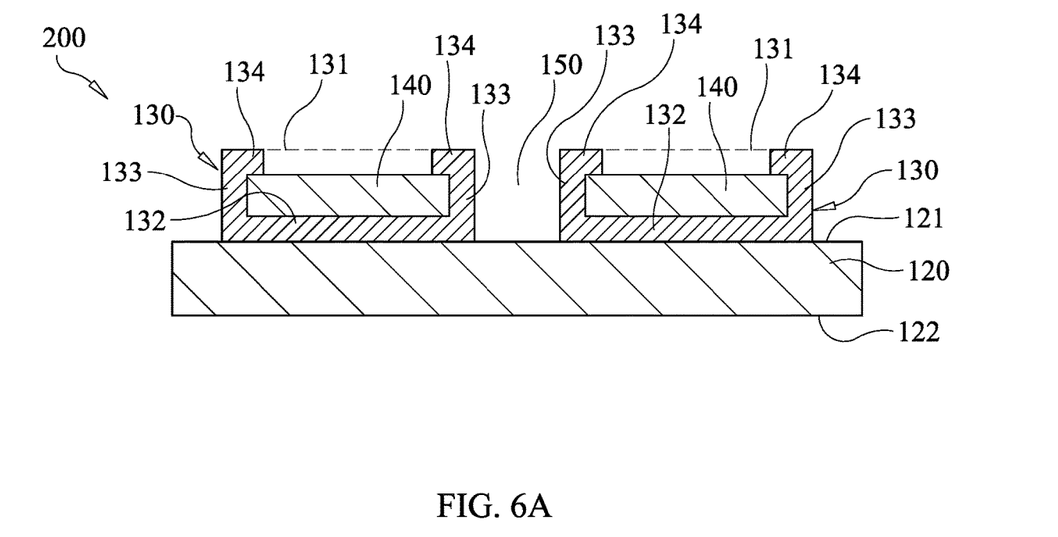
FIG. 6A is a cross-sectional view illustration of one embodiment of a flexible cover system taken along line 6-6 in FIG. 5 in accordance with various aspects as described herein.
Figure 6B:
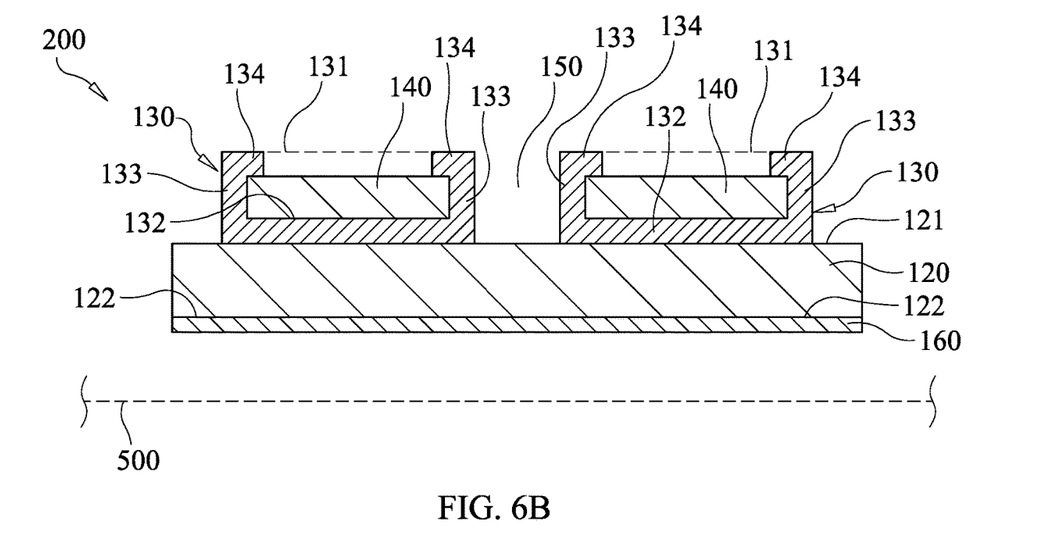
FIG. 6B is a cross-sectional view illustration of another embodiment of a flexible cover system taken along line 6-6 in FIG. 5 in accordance with various aspects as described herein.
Figure 6C:
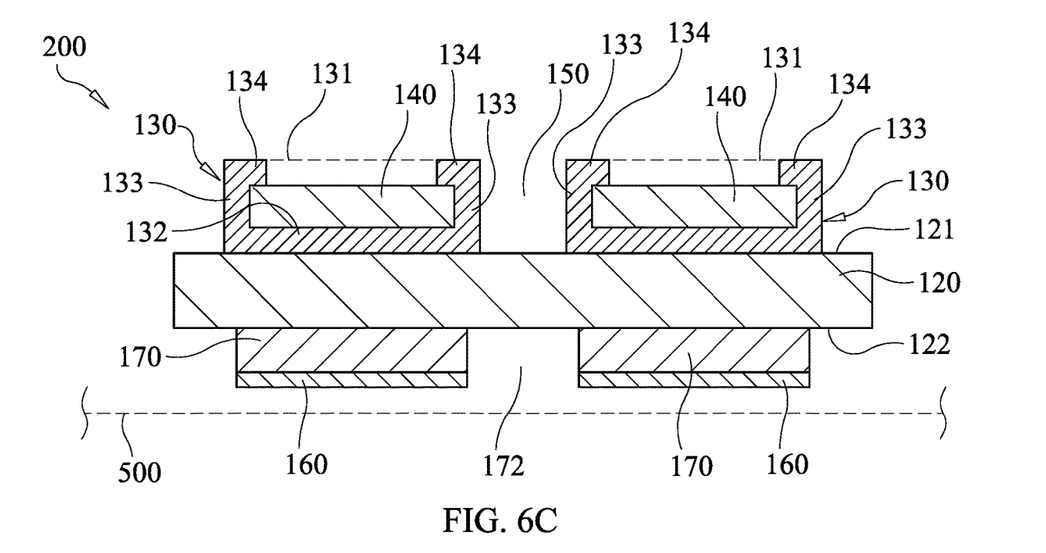
FIG. 6C is a cross-sectional view illustration of another embodiment of a flexible cover system taken along line 6-6 in FIG. 5 in accordance with various aspects as described herein.
Figure 6D:
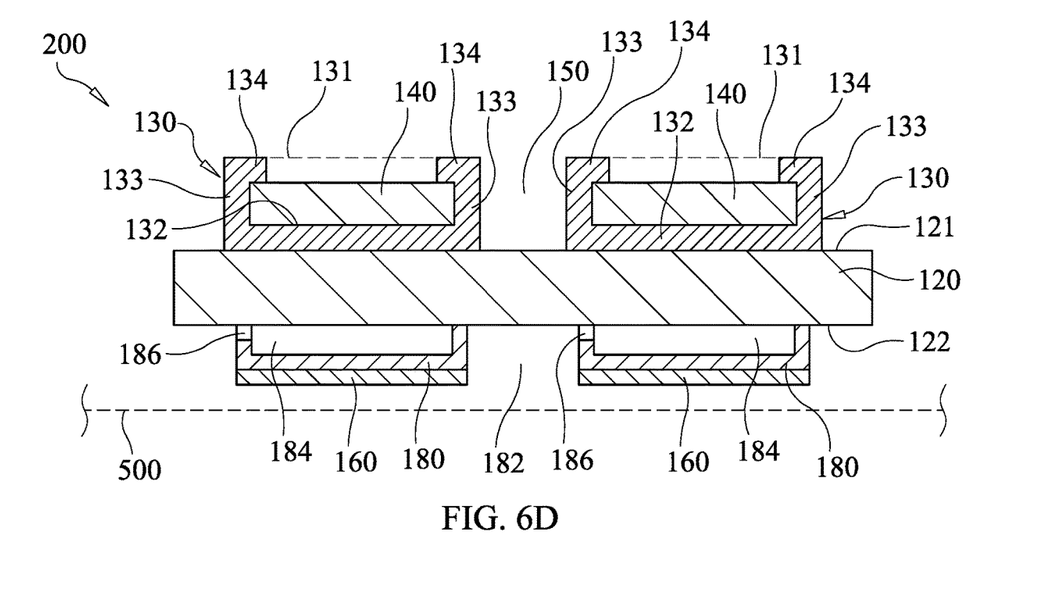
FIG. 6D is a cross-sectional view illustration of another embodiment of a flexible cover system taken along line 6-6 in FIG. 5 in accordance with various aspects as described herein.
Figure 7A:
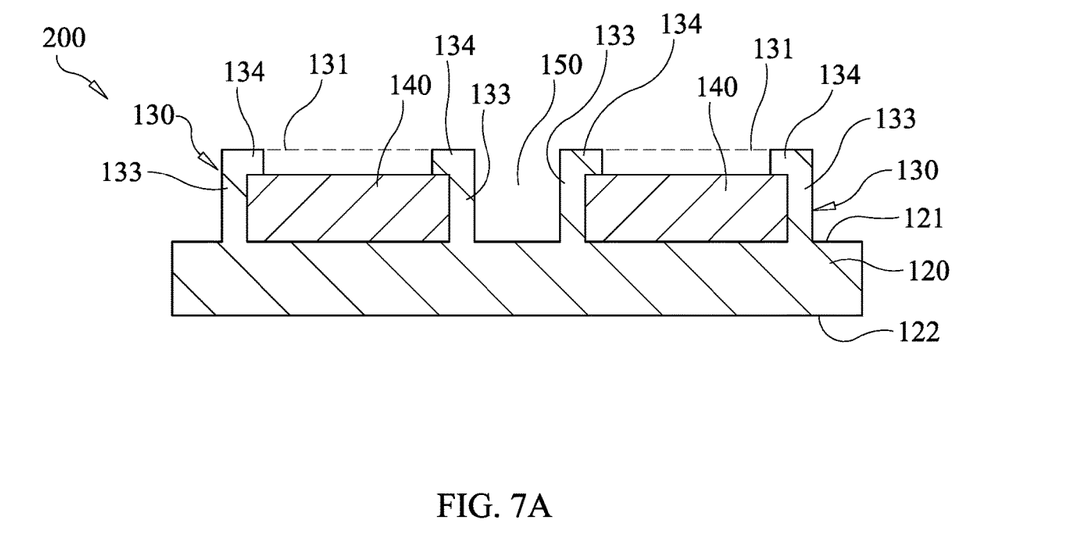
FIGS. 7A-7D are cross-sectional view illustrations of other embodiments of a flexible cover system taken along line 6-6 in FIG. 5 in accordance with various aspects as described herein.
Figure 7B:
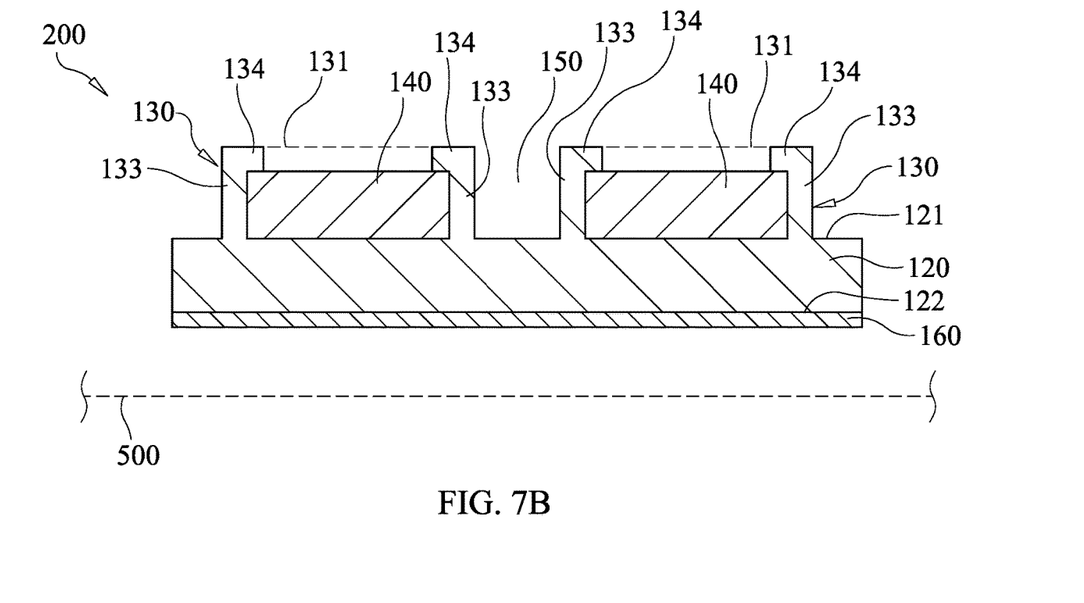
Figure 7C:
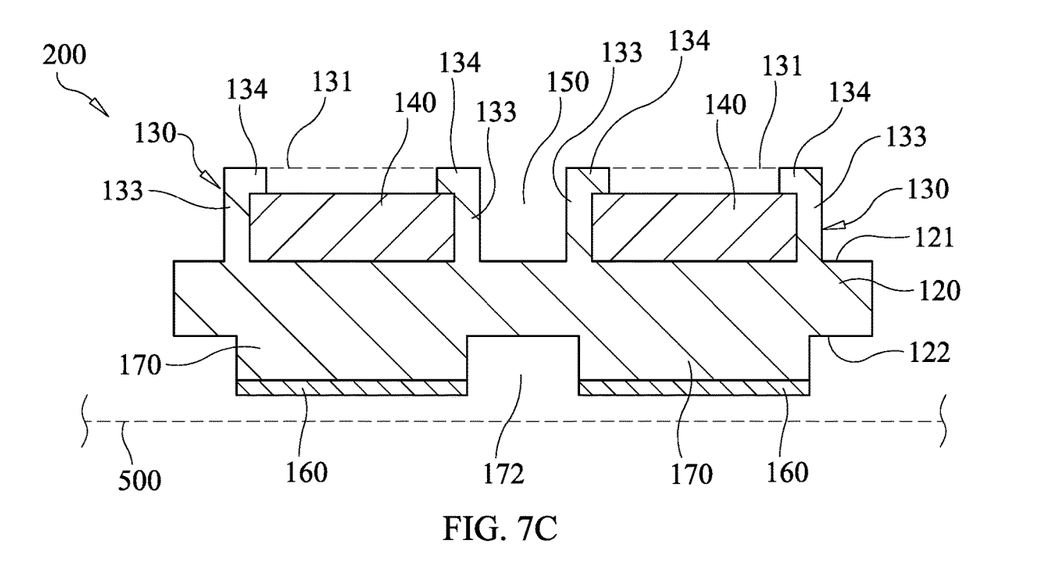
Figure 7D:
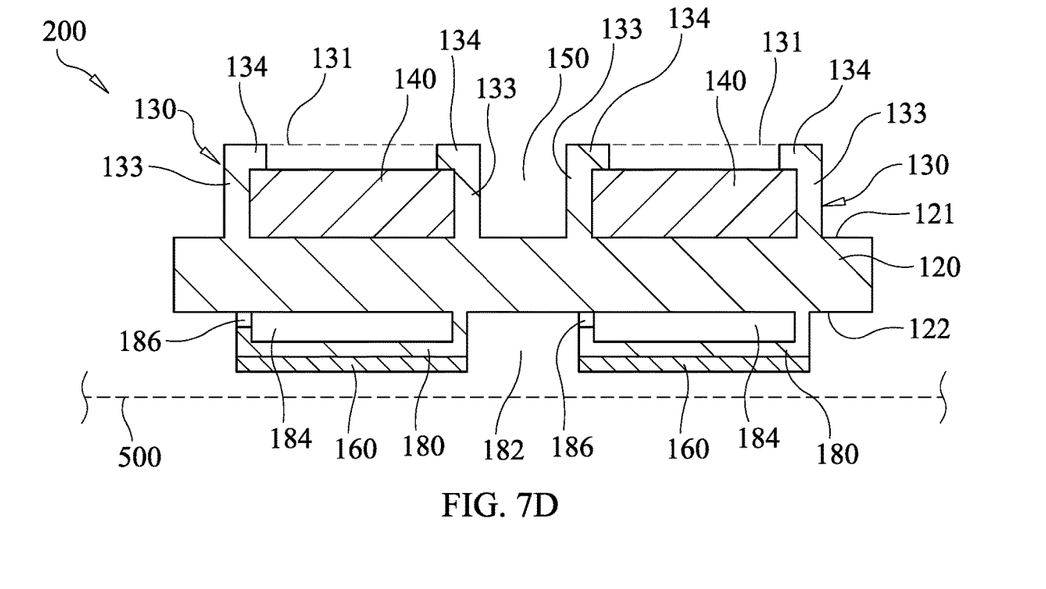

In some embodiments, the receptacles described herein may include positive body-retention features. For example and as illustrated in FIG. 5, each receptacle 130 of a flexible cover system 200 may include an annular lip 134 at its opening 131. When each receptacle 130 is flexible and elastic, lips 134 can flex into their receptacle as a body 140 is inserted into the receptacle. Once the body 140 is inserted into its receptacle 130, lips 134 flex back to their original position to positively retain body 140 in the receptacle. Exemplary embodiments of system 200 employing lips 134 for the embodiments illustrated in FIGS. 3A-3D are illustrated in the cross-sectional views presented in FIGS. 6A-6D. Exemplary embodiments of system 200 employing lips 134 for the integrated embodiments illustrated in FIGS. 4A-4D are illustrated in the cross-sectional views presented in FIGS. 7A-7D.

Figure 8A:
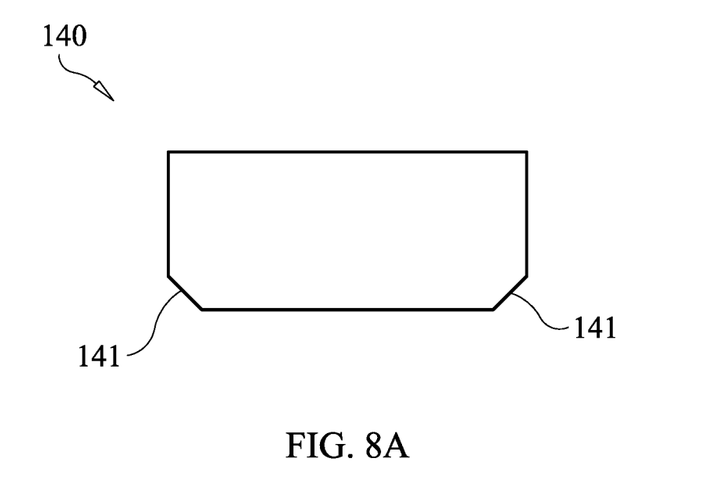
FIG. 8A is an isolated side view illustration of one embodiment of a body to be retained by the flexible cover system in accordance with various aspects as described herein.
Figure 8B:
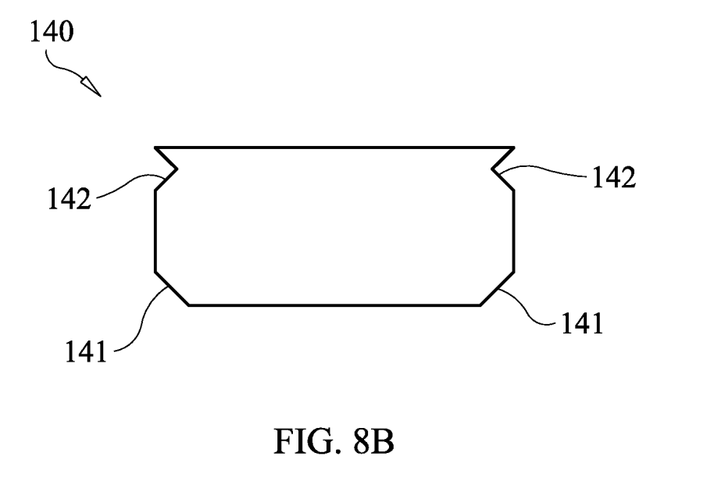
FIG. 8B is an isolated side view illustration of another embodiment of a body to be retained by the flexible cover system in accordance with various aspects as described herein.

Each body 140 can include features to facilitate its insertion into a receptacle 130 and/or features that facilitate its retention in the receptacle. For example, FIG. 8A illustrates a body 140 having beveled edges 141 around its base to facilitate its insertion into a receptacle. In another embodiment, a body 140 may additionally or alternatively include an annular channel 142 near its top/visible face 143 where annular channel 142 is operable to cooperate with a lip 134 of a receptacle 130.

The advantages of the systems described herein are numerous. The cover system may be customized in terms of shape, size, decoration, and/or function. The bodies can be readily changed for different looks and/or functions. When used on vehicle surfaces, the cover system may be used to achieve a decorative result, may be used to cover existing damage, and/or may be used on damage-prone regions to protect the so-covered surface thereby preserving a vehicle's appearance and value.

Although the disclosure describes specific embodiments, there are numerous variations and modifications that will be readily apparent to those skilled in the art in light of the above teachings. For example, in some embodiments, multiple bodies may be disposed in a single open-top receptacle. Further, in some embodiments, the above-described vented cushions (e.g., cushions 180) may be vented through the above-described sheet 120. Still further, in some embodiments, electrical lines, traces, etc., may be deposited on and/or incorporated into the system's flexible materials to provide power and/or signal carrying capabilities. It is therefore to be understood that, within the scope of the appended claims, the systems and methods described herein may be practiced other than as specifically described.

What is claimed as new and desired to be secured by Letters Patent of the United States is:

1. A system, comprising:
a sheet of flexible material having a first face and a second face opposing said first face;
a set of receptacles, each receptacle from said set of receptacles having walls coupled to said first face and extending to an opening of said receptacle, said walls associated with each said receptacle separated from said walls associated with adjacent ones of said receptacles by an air-filled gap;
a set of spaced-apart cushions coupled to said second face, each of said cushions aligned with a corresponding one of said receptacles; and
a set of bodies, each body from said set of bodies configured for retention in one of said receptacles by said walls associated therewith.

2. The system of claim 1, further comprising a material disposed on said second face, said material selected from the group consisting of an adhesive and a magnetic material.

3. The system of claim 1, wherein said walls are flexible.

4. The system of claim 1, further comprising a lip coupled to said walls at said opening of each said receptacle, said lip extending partially over said opening of said receptacle.

5. The system of claim 1, further comprising a material disposed on each of said cushions, said material selected from the group consisting of an adhesive and a magnetic material.

6. The system of claim 1, wherein each of said cushions includes a vented air space.

7. A system, comprising:
a sheet of flexible material having a first face and a second face opposing said first face;
a set of spaced-apart open cells, each of said open cells coupled to said first face and having an opening aligned parallel to said first face, each of said open cells separated from adjacent ones of said open cells by an air-filled gap;
a set of spaced-apart cushions coupled to said second face, each of said cushions aligned with a corresponding one of said open cells; and
a body disposed in each of said open cells and visible via said opening associated therewith.

8. The system of claim 7, further comprising a material disposed on said second face, said material selected from the group consisting of an adhesive and a magnetic material.

9. The system of claim 7, wherein each of said open cells is flexible.

10. The system of claim 7, wherein each of said open cells includes an annular lip at said opening thereof for retention of said body disposed therein.

11. The system of claim 7, further comprising a material disposed on each of said cushions, said material selected from the group consisting of an adhesive and a magnetic material .

12. The system of claim 7, wherein each of said cushions includes a vented air space.

13. A system, comprising:
a sheet of flexible material having a first face and a second face opposing said first face;
a set of flexible-wall open cells integrated with said sheet at said first face, each of said open cells being separated from each of adjacent ones of said open cells by an air-filled gap, each of said open cells having an opening aligned parallel to said first face;
a set of spaced-apart cushions coupled to said second face, each of said cushions aligned with a corresponding one of said open cells; and
a body disposed in each of said open cells and visible via said opening associated therewith.

14. The system of claim 13, further comprising a material disposed on said second face, said material selected from the group consisting of an adhesive and a magnetic material.

15. The system of claim 13, wherein each of said open cells includes an annular lip at said opening thereof for retention of said body disposed therein.

16. The system of claim 13, further comprising a material disposed on each of said cushions, said material selected from the group consisting of an adhesive and a magnetic material.

17. The system of claim 13, wherein each of said cushions includes a vented air space.

* * * * *